Figure 1:
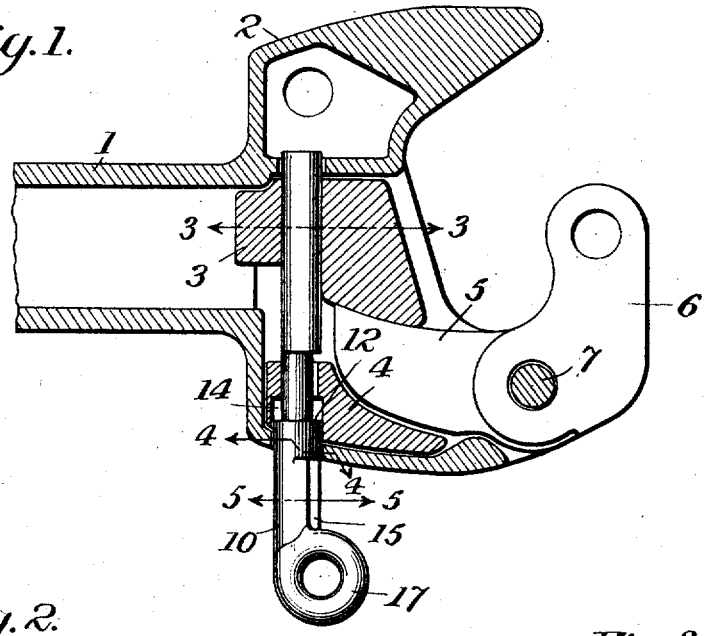

No. 12,420. REISSUED DEC. 12, 1905.

A. H. RENSHAW.

CAR COUPLING.

APPLICATION FILED FEB. 2, 1905.

2 SHEETS—SHEET 1.

Witnesses
J. G. Stinkel
A. E. Fansmann.

Inventor
Alfred H. Renshaw
by
Foster Freeman & Watson
Attorneys

No. 12,420. REISSUED DEC. 12, 1905.

A. H. RENSHAW.

CAR COUPLING.

APPLICATION FILED FEB. 2, 1905.

2 SHEETS—SHEET 2.

Witnesses
J. G. Stinkel
A. E. Hansmann

Inventor
Alfred H. Renshaw
by Foster Freeman & Watson
Attorneys

UNITED STATES PATENT OFFICE.

ALFRED H. RENSHAW, OF DARIEN, CONNECTICUT, ASSIGNOR TO THE TROJAN CAR COUPLER COMPANY, A CORPORATION OF NEW YORK.

CAR-COUPLING.

No. 12,420. Specification of Reissued Letters Patent. Reissued Dec. 12, 1905.

Original No. 737,772, dated September 1, 1903. Application for reissue filed February 2, 1905. Serial No. 243,911.

*To all whom it may concern:*

Be it known that I, ALFRED H. RENSHAW, a citizen of the United States, residing at Darien, in the county of Fairfield and State of Connecticut, have invented certain new and useful Improvements in Car-Couplers, of which the following is a specification.

The invention relates to such improvements; and it consists of the novel construction and combination of parts hereinafter described.

Reference may be had to the accompanying drawings, and the reference characters marked thereon, which form a part of this specification.

Similar characters refer to similar parts in the several figures therein.

This invention relates to that class of car-couplers shown and described in United States Letters Patent No. 431,195, issued to A. H. Renshaw and H. H. Burden, July 1, 1890, in which the lock-block of the draw-head can be operated without going between the cars by means of a handle at one side and suitable connections.

The object of my invention is to provide a draw-head with means adapted to be operated from the side of the car for raising and locking and releasing the locking-block without necessarily causing the knuckle to swing outwardly to the open position, but leaving it free to do so, and permit one car to be uncoupled from another without further hand manipulation, whereby the locking-block can be restored to position if improperly raised and whereby in shunting an end car from a train of coupled cars the lock-block may be raised to an unlocking position and locked in such raised position in one of the couplers between the end car to be shunted and the train, which end car remains coupled to the train so long as it is pushed, and when the speed of the train is checked the end car is uncoupled and advanced by reason of its momentum over a switch to another track, the train being stopped before reaching the switch.

The invention consists in providing means whereby the lock-block can be operated, which means also embodies devices whereby to lock the block when raised and also to release the same without the employment of other means. These, as hereinafter set forth, are used in connection with a push-block and actuating-rod, and I provide the actuating-rod and the draw-head with interlocking surfaces and the push-block with the countersink at the outer end of its rod-aperture, so that the rod may be given a rotatory motion to raise the lock-block and then a reciprocatory inward movement to bring locking-surfaces on the rod and draw-head into engagement with each other to securely lock the lock-block in its raised position without operating the push-block, the shoulder on the actuating-rod, which is designed to operate the push-block, being free to enter the countersink sufficiently to bring the locking-surfaces together without operating such block, whereby the coupler is unlocked, but the knuckle not opened until a further longitudinal movement is imparted to the actuating-rod, causing the shoulder on the rod to engage the bottom of the countersink and force the push-block inwardly to open the knuckle, as will be hereinafter more fully shown and described.

Figure 2:
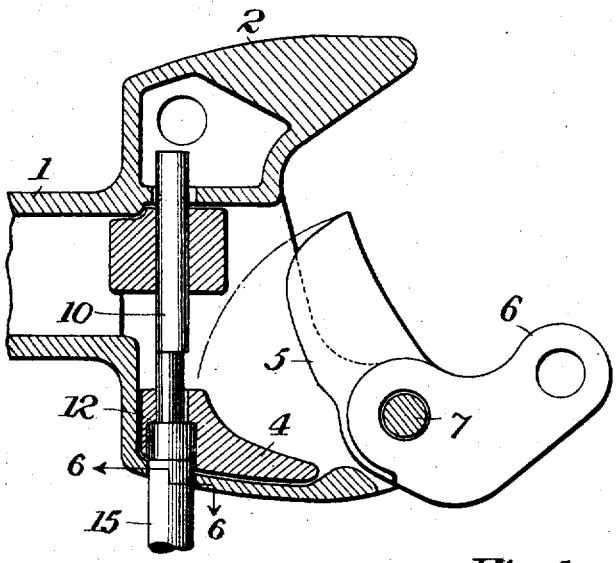
Figure 3:
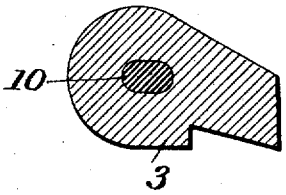
Figure 4:
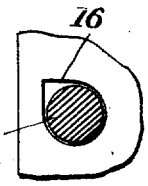
Figure 5:
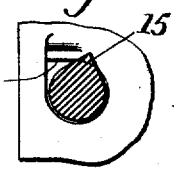
Figure 6:
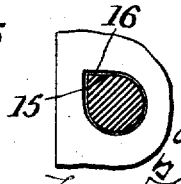
Figure 7:
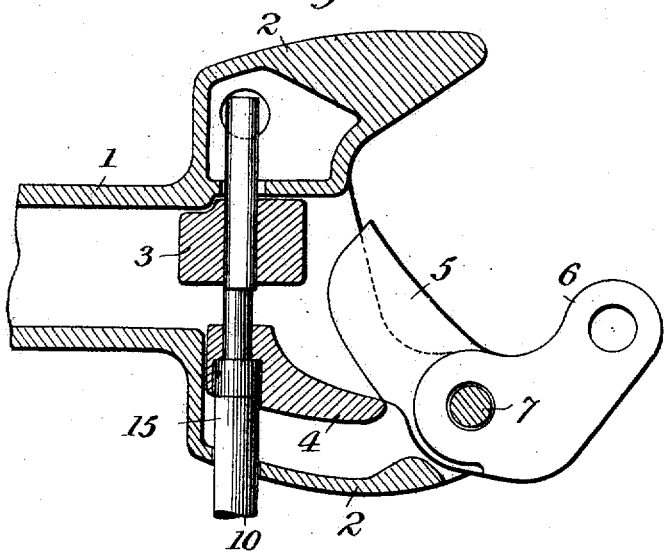
Figure 8:
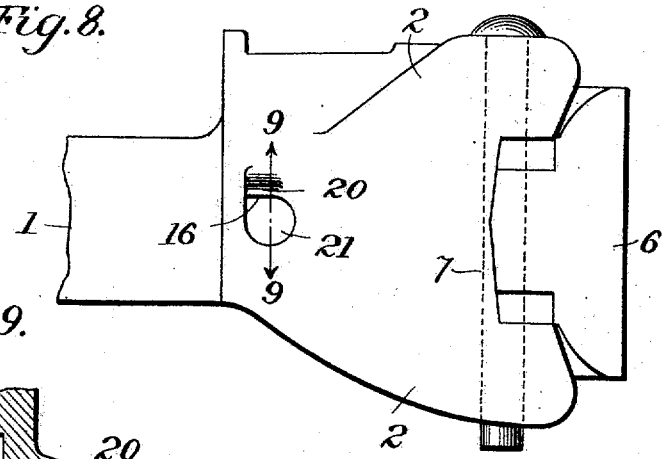
Figure 10:
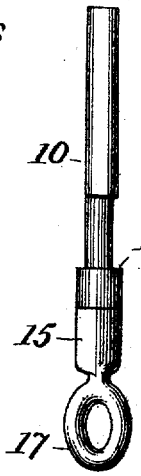
Figure 9:
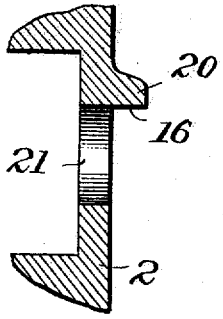

Referring to the drawings, Figure 1 is a central horizontal section of one of the two like parts forming a car-coupler, showing the position of the parts when in a locked position and showing the actuating-rod in full. Fig. 2 is a similar view showing the knuckle swung out to an open or unlocked position and the locking-block raised to an unlocking position. Fig. 3 is a cross-section of the locking-block, taken on the broken line 3 3 in Fig. 1. Fig. 4 is a vertical section taken on the broken line 4 4 in Fig. 1. Fig. 5 is a similar section taken on the broken line 5 5 in Fig. 1 and showing the side of part of the draw-head in elevation. Fig. 6 is a similar section taken on the broken line 6 6 in Fig. 2. Fig. 7 is a view similar to that shown in Figs. 1 and 2 and showing the push-block in a position in the act of swinging the knuckle of the coupler outward to an open position. Fig. 8 is a side elevation of the draw-head and knuckle with the knuckle in a closed position. Fig. 9 is a vertical section of the outer wall of the draw-head, taken on the broken line 9 9 in Fig. 8. Fig. 10 is a plan view of the actuating-rod detached and in the position shown in Figs. 2 and 6. Figs. 3, 4, 5, 6, and 9 are made upon an enlarged scale.

The draw-bar 1 (shown partly broken away) is provided with a hollow head 2, which contains the lock-block 3 and the push-block 4 and to which is pivoted the knuckle 6 by means of the vertical pin 7. The lock-block, knuckle, and push-block are operated or actuated by the rod 10, called the "actuating-rod."

The movable parts are shown in a locked position in Fig. 1, wherein the lock-block has been dropped down at the side of the tail-piece of the knuckle, securely locking the same in the position shown.

The actuating-rod, which has an eye 17 at the end for connection with the operating-rod extending to the side of the car, is capable of a reciprocatory movement only through the lock-block, the cross-sectional form of the rod and its aperture in the lock-block being shown in Fig. 3. The rod is capable of a rotary movement in the push-block and when in the position shown in Fig. 1 of a rotary movement in the head. By imparting to the rod a rotatory or rocking movement to the left the lock-block is lifted from the side of the tailpiece 5 to the position shown in Fig. 2, which leaves the knuckle free to swing to an open position, as seen in that figure. When the lock-block has been so raised to its unlocking position, the knuckle can be forced open by an inward movement of the actuating-rod sufficient to cause the enlargement or shoulder 12 to engage the push-block and force the latter out to the position shown in Fig. 7; but if it is desired to unlock the coupler without opening the same, as in shunting an end car from a train, the actuating-rod is turned sufficiently to lift the block and is then given an inward movement sufficient only to bring into engagement with each other the locking-surface 15 of a projection or rib on the actuating-rod and the similar surface 16 on the draw-head. This will be easily understood by reference to the cross-sectional views in Figs. 4, 5, and 6. That part of the actuating-rod where section 4 is taken is circular in cross-section, as seen in Fig. 4, while the aperture has a V shape on the upper left-hand side, presenting what is here termed a "locking-surface" at 16. The connecting-rod between the eye 17 and the cylindrical portion is provided with a V-shaped rib or projection, as seen in Fig. 5, which has on one side the locking-surface 15. When the locking-rod is given a rotatory movement to lift the lock-block, it rotates from the position shown in Figs. 1 and 5 to that shown in Figs. 2 and 6. It will be seen in Fig. 6 that the V-shape projection on the rod is adapted to fit the V-shape groove in the wall of the draw-head when the rod is given an inward movement, whereby the engagement of the locking-surfaces 15 on the rod and 16 on the draw-head prevents any rotatory movement of the rod, and the lock-block is securely locked in its raised or unlocking position. When desired, the wall of the draw-head at this point may be thickened by an outward projection 20, as seen in Figs. 8 and 9, the rod-aperture being shown at 21. If after the block is raised and locked and before the knuckle is opened it is found that the cars should not be uncoupled at this point or it is otherwise seen to be unnecessary to open the knuckle, then by merely drawing out the actuating-rod to separate the locking-faces the rod is capable of being turned to permit the block to be lowered and the knuckle again locked. It will be seen that this is effected without going between the cars by devices embodied in the block-elevating means and without the use of auxiliary appliances requiring to be independently actuated.

In order that the locking-surfaces may be brought into engagement with each other, it is necessary that the cylindrical portion of the actuating-rod should pass approximately all the way through the wall of the draw-head, and to permit of such passage the push-block is provided with the countersink 14, deep enough to permit of the reception of the enlargement or cylindrical portion of the actuating-rod, as seen in Fig. 2, whereby a sufficient reciprocatory movement may be imparted to the actuating-rod to bring the locking-surfaces 15 and 16 into and out of engagement with each other without disturbing the position of the push-block.

It is not intended to limit the location of the interlocking surfaces on the rod and head to any particular position, as it is obvious that they may be located at the inner end of the rod or at any point where surfaces on the rod and head could interlock.

What I claim as new, and desire to secure by Letters Patent, is—

1. In a car-coupler of the class described, the combination with a lock-surface on the reciprocatory and rotatory block-actuating rod, of a lock-surface on the draw-head adapted to be engaged by the lock-surface on the rod when the rod is given a rotatory movement to raise the lock-block from its locking position and subsequently an inward longitudinal movement, whereby the lock-block is locked in such raised position, substantially as described.

2. In a car-coupler of the class described, the combination with the lock-block and draw-head, of an actuating-rod reciprocatory in apertures in such block and head, the said apertures and rod being so shaped in cross-section that while the rod is not rotatory in the lock-block in any position, it is rotatory in the draw-head in one longitudinal position to raise the lock-block from its locking position, and in another position longitudinally it is not rotatory in a direction to restore the lock-block to its locking position.

3. In a car-coupler of the class described, the combination with the lock-block and push-block of a draw-head, of an actuating-rod sliding in the said blocks and having an enlargement adapted to a socket in the push-block, and provided with a projection arranged to engage a face on the draw-head when the rod is turned to elevate the lock-block and the enlargement is partly in said socket, substantially as set forth.

4. In a car-coupler of the class described, a lock-block, a push-block, and a rod sliding in both blocks and rotating with the lock-block, and provided with an enlargement adapted to a socket of the push-block to permit the rod to have a limited longitudinal movement independent of the push-block, substantially as set forth.

5. In a car-coupler of the class described, the combination with an actuating-shoulder on the reciprocatory and rotatory rod, of a push-block apertured for the passage of the rod and provided with a countersink at the outer end of the aperture in which the shoulder is free to travel during the reciprocatory locking movement of the rod, and a shoulder at the bottom of the countersink engageable by the rod-shoulder to actuate the push-block, substantially as described.

6. The combination with the pivoted knuckle and locking-block of a draw-head, of lifting means for carrying the block to its locking and unlocking positions, and means connected with the draw-head itself for securing said lifting means when holding the block in unlocking position and for permitting the release of said lifting means to restore the block to locking position, substantially as set forth.

7. The combination with the knuckle and lock-block of a draw-head, of means for elevating the block extending laterally from the draw-head and embodying also devices connected with said means and with the draw-head which in one position will lock the elevated block and in another position will release the same, substantially as set forth.

8. The combination in a draw-head, of a pivoted knuckle, a lock-block pivoted to swing downward by gravity, a rod connected to lift the block by a rotary movement, and devices partly on the draw-head for retaining the block elevated and for locking and unlocking the block by a longitudinal movement of the rod, substantially as set forth.

9. The combination in a draw-head, of a pivoted knuckle, a lock-block, a rod connected to lift the block by a rotary movement, and a projection on the rod adapted on a longitudinal movement of the rod to engage a part of the draw-head to lock the block in its elevated position, substantially as set forth.

10. The combination in a draw-head, of a pivoted knuckle, a lock-block, a rod turning in bearings of the draw-head and sliding in said block, and a projection on the rod adapted when the rod is in one position to engage a part of the draw-head to lock the block in an elevated position, substantially as set forth.

11. The combination in a draw-head, of a pivoted knuckle, a lock-block, a rod turning in bearings of the draw-head and sliding in said block, and a projection on the rod adapted when the rod is in one position to engage a part of the draw-head to lock the block in an elevated position, and to release the block when the longitudinal position of the rod is changed, substantially as set forth.

In testimony whereof I have signed my name to this specification in the presence of two subscribing witnesses.

ALFRED H. RENSHAW.

Witnesses:
EUGENE SEITZ,
M. J. CUNNINGHAM.